Sept. 14, 1943. W. A. SHURCLIFF 2,329,657
SPECTROPHOTOMETER
Filed Feb. 21, 1942 4 Sheets-Sheet 1

INVENTOR
WILLIAM A. SHURCLIFF,
BY
Harvey W. Edelblute
ATTORNEY.

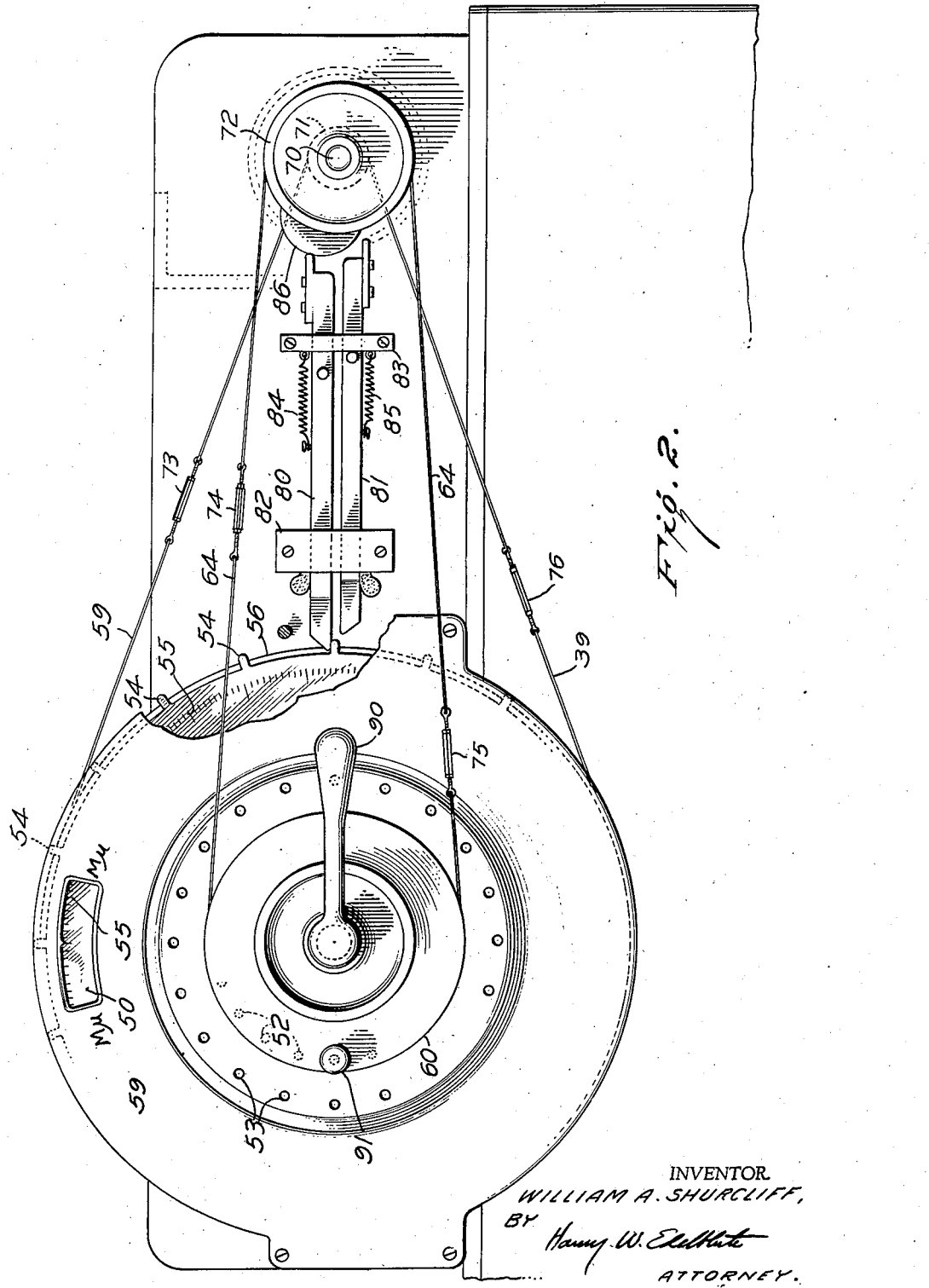

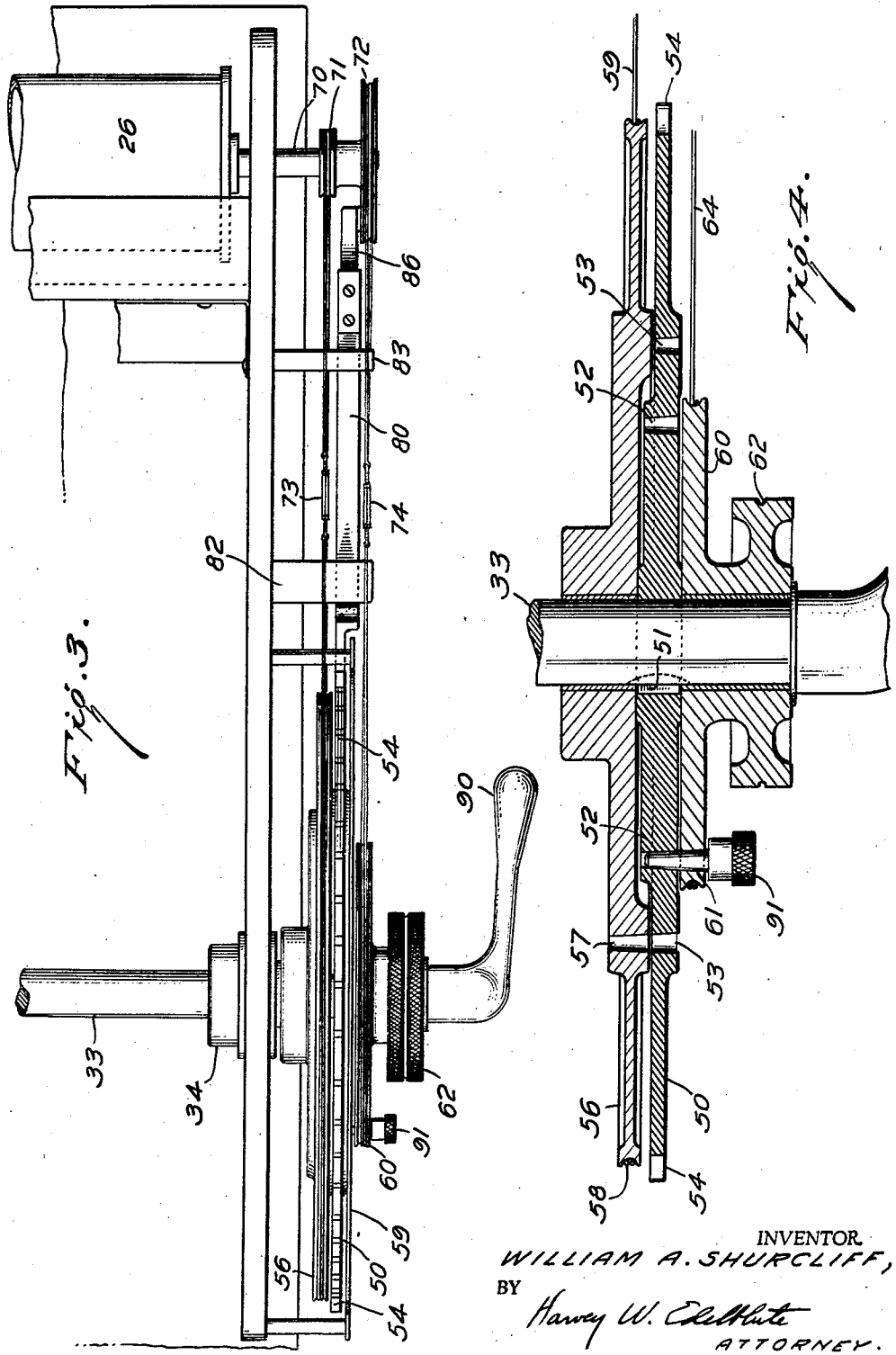

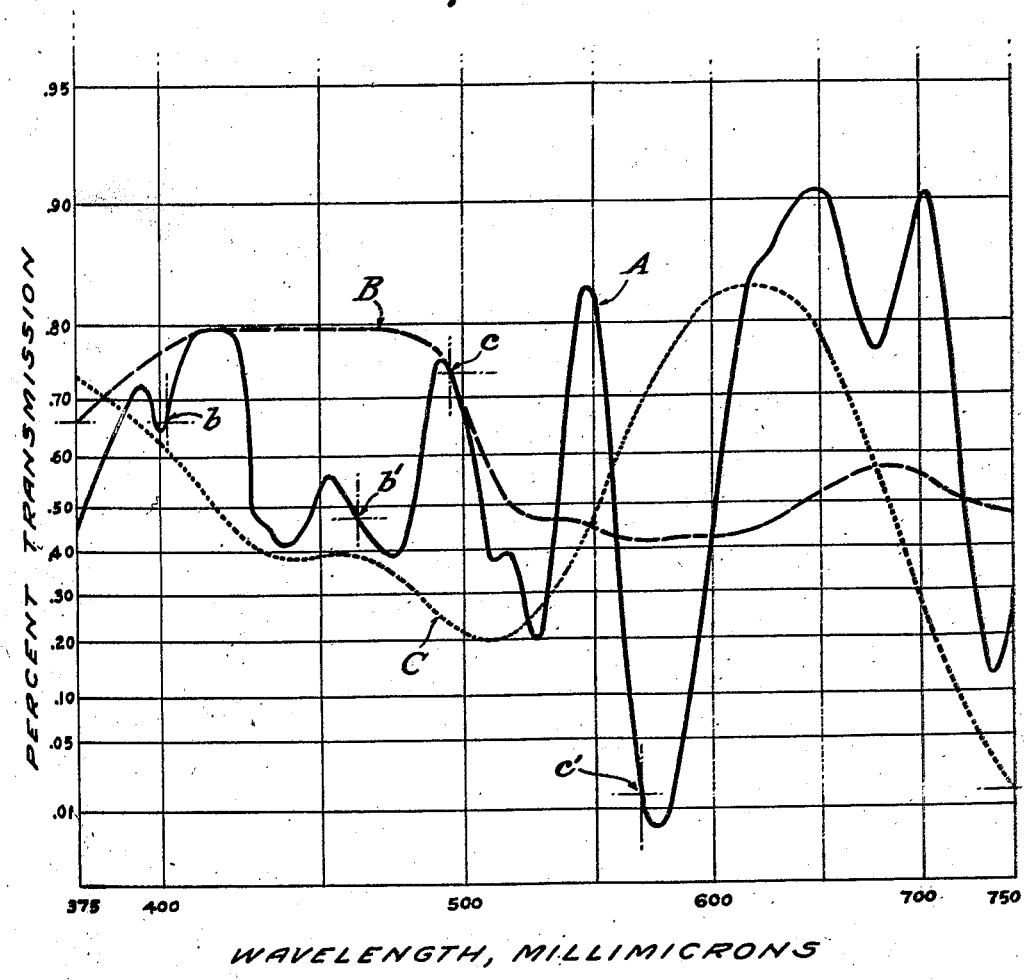

Patented Sept. 14, 1943

2,329,657

UNITED STATES PATENT OFFICE 2,329,657

SPECTROPHOTOMETER

William A. Shurcliff, Plainfield, N. J., assignor to American Cyanamid Company, New York, N. Y., a corporation of Maine Application February 21, 1942, Serial No. 431,806

6 Claims. (Cl. 234—1)

This invention relates to improvements in recording spectrophotometers. More particularly, the invention relates to means associating the recordng system of the spectrophotometer with the means controlling the wave length of light passing through the instrument.

Recording spectrophotometers have become very useful in industry in identifying, analyzing and matching colored objects. The identity of many dyes may be determined, for example, by the manner in which its aqueous solutions transmit light at different wave lengths. Dyes and pigments may also be identified by the relative intensity of light reflected from these bodies at particular wave lengths. The particular coloring matters, or combinations thereof, employed in paints, stains, inks, printing pastes, foods, beverages, etc. may be quickly identified by analysis of their color characteristics as recorded by the spectrophotometer. The colors of dyed and printed cloth, paper, leather, etc. may be readily classified and matched with the aid of the instrument. Many other industrial applications of the recording spectrophotometer could also be mentioned.

The colored object to be examined by the spectrophotometer is subjected to a series of substantially monochromatic light beams and the ratio of the intensity of the light reflected from, or transmitted through, the sample to the intensity of the incident beam is graphically recorded. As the relative intensity of the monochromatic beam reflected by or transmitted through most colored objects varies with the wave length of the beam the recording device is so arranged that it plots a curve one coordinate of which represents relative light intensity while the other coordinate represents the wave length of the monochromatic beam.

Ordinarily spectrophotometric measurements of colored bodies are made over a spectral range which includes all of the visible light; that is, over a range of about 375 m$\mu$ to 750 m$\mu$ in wave length. It is desirable in some cases, however, to extend the recorded range into the ultraviolet spectra or into the infrared region of the spectra when determining the absorption characteristics of certain bodies. For example, there are certain yellow and orange dyes whose solutions absorb light most strongly in the ultraviolet spectral range. Also a number of green and blue dyes absorb light strongly in the infrared range. Positive identification of these dyes requires a determination of their absorption characteristics at wave lengths outside the visible range. Accordingly it is highly desirable to have an instrument capable of great flexibility in its ability to record spectrophotometric measurements over a wide range. Obtaining spectrophotometric absorption curves over a range of from 300 m$\mu$ to 1100 m$\mu$ is not an uncommon requirement for the instrument.

It has been found that practically every dyestuff shows at least one strong absorption peak and also a spectral region of high transmission. These characteristic absorption or transmission bands serve as convenient means of identifying particular dyes. In some cases, however, the characteristic absorption or transmission curves of related dyes are very close together and it is difficult to distinguish the dyes on the scale plotted by the recording device. It is desirable in such cases to expand, or magnify, the plotted curve so that its characteristics may be examined with greater ease and accuracy. For example, the two dyes crystal violet and methyl violet show absorption characteristics so similar in character that it is difficult to distinguish between the spectrophotometric curves obtained from the two homologous materials. By magnifying the critical portions of their absorption curve it is possible to clearly distinguish the two dyes. It is accordingly desirable that the recording spectrophotometer be quickly adaptable to record spectrophotometric data with an increased degree of magnification.

Heretofore it has not been possible with the recording spectrophotometers available to obtain photometric analyses of colored bodies with the speed, flexibility and accuracy desired. An instrument designed for operation in the visual range could not be employed to record results in the infrared range, ultraviolet range or in a mixed range as from 500 m$\mu$ to 1000 m$\mu$ without making certain structural changes in the instrument. Such changes required time to make and always involved the possibility of damaging the instrument or getting it out of adjustment. Still other changes in the instrument were required when it was desired to magnify desired portions of a spectral range. The small amount of work that could be done due to the excessive time required for making the frequent but necessary changes and the necessity of having the instrument operated by a skilled technician made the operation of such spectrophotometers too cumbersome and expensive for many industrial purposes.

By virtue of my improvements in recording spectrophotometers, which improvements are to be presently described, it is possible to greatly increase the capacity of these instruments not only as to the volume of work which they are capable of doing but also in their ability to record spectrophotometric data over a wide range of conditions. Spectrophotometers with the improvements herein described are capable of successively recording data over the entire useful spectra or any desired portion thereof with a selected degree of magnification. The recordings may be quickly and easily made by a comparatively untrained operator without any danger of damage to the instrument or with any decrease in its accuracy. Other objects of my invention will appear hereinafter.

My invention will now be described with reference to the accompanying drawings which illustrate my improvements in spectrophotometers in conjunction with a spectrophotometer of the flickering beam type. The optical system and the operation of spectrophotometers of this type are described and illustrated in detail in the patents to Orrin W. Pineo Nos. 2,107,836, dated February 8, 1938 and 2,218,357, dated October 15, 1940 and need not be described in great detail here. It is to be understood, however, that the improvements constituting my invention are not to be limited to the particular spectrophotometer described since they are easily adaptable to any spectrophotometer comprising a recording system and means controlling the wave length of light passing through the instrument. In the drawings:

Fig. 2 is an elevation of the wave-length-shifting and magnification-selecting mechanism, recording drum driving means and automatic drum stop.

Fig. 3 is a plan view of the parts shown in Fig. 2.

Fig. 4 is an enlarged cross-sectional plan view of essential portions of the wave-length-shifting and magnification-selecting mechanism taken along the line 4—4 of Fig. 2.

Fig. 5 is a reproduction of actual transmission curves drawn by the recording device showing, in part, the flexibility of the instrument when employing my wave-length shifting and magnification-selecting mechanism.

Figure 1:
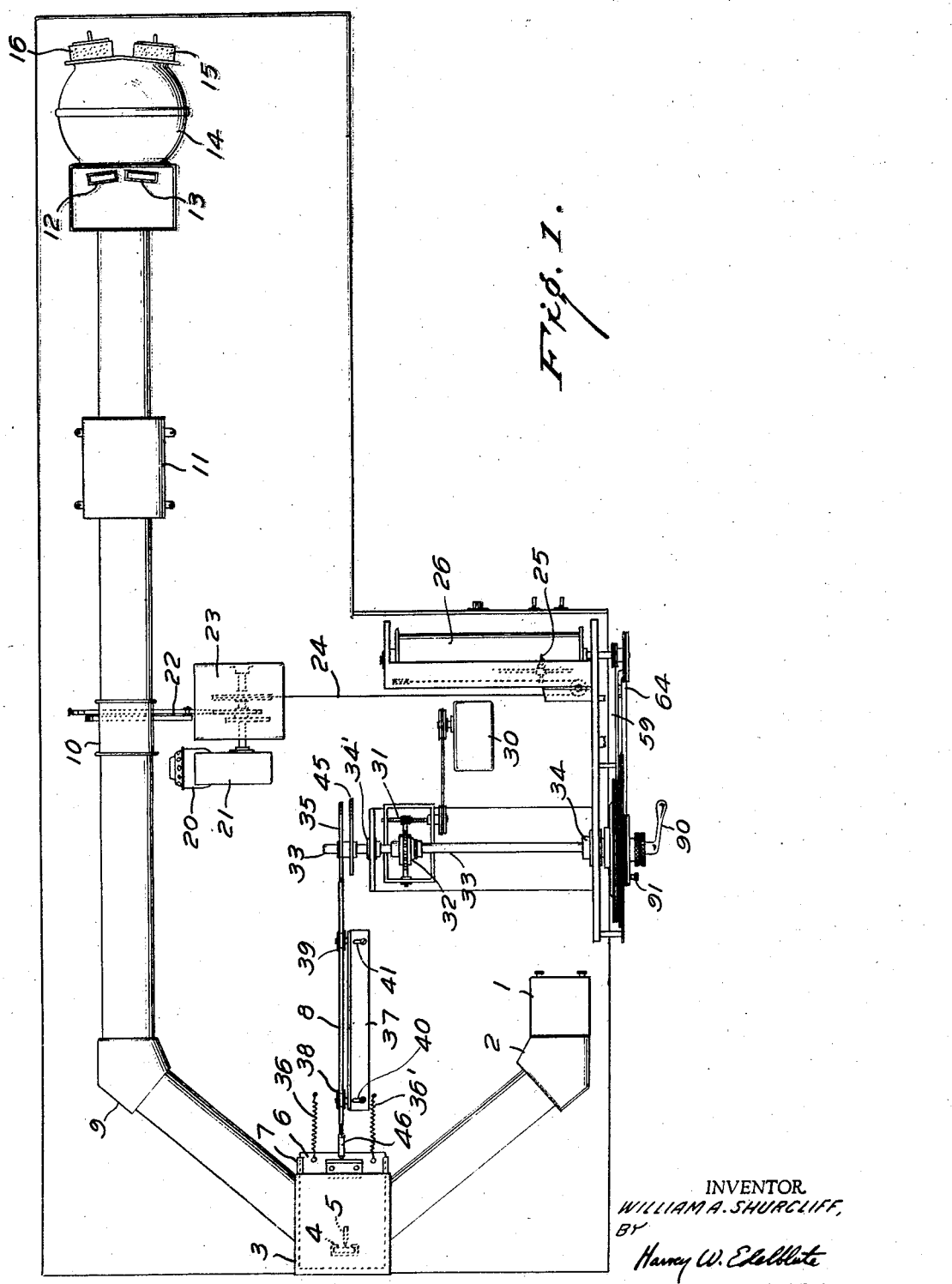
Fig. 1 is a plan view showing essential portions of a spectrophotometer including a monochromator and a recording device with means associating the two which comprises the invention to be described herein.

Referring to Fig. 1 reference numeral 1 indicates a housing for a light source, condensing lenses and variable slit, and housing 2 contains collimating lenses and a prism. In this type of monochromating device light passing through a prism is refracted to produce a prismatic spectrum which enters the monochromator control generally shown at 3. This monochromator control comprises a slit formed by a mirror 4 and knife edge 5 both being mounted on a carriage 6 slidably mounted in a base 7. The slit formed by the mirror and knife edge allows a beam of substantially monochromatic light to pass through the instrument, the wave length of which depends upon the relative position of the slit with respect to the refracted light from the prism. Movement of the carriage with the slit forming members is accomplished through monochromator drive rod 8 as will be apparent later.

Monochromatic light issuing from the control slit of the monochromator is directed by optical parts in housing 9 into a polarizing photometering prism in the optical system located generally at 10. The plane polarized monochromatic light beam next passes through a Wollaston prism where it is separated into two beams plane polarized at right angles to each other.

The two beams then pass through a flickering prism (not shown) mounted in the center of a hollow shaft in the rotor of a synchronous motor 11. When transmission measurements are to be made with the instrument one of the flickering light beams is caused to pass through a standard reference sample 12 which may be a glass filter of known optical properties or merely distilled water enclosed in a container having polished plane glass or quartz walls. The other flickering light beam is caused to pass through the sample whose light transmission characteristics are to be determined. When the unknown sample is a liquid it is enclosed in a container 13 similar to the container 12. The light beams then pass into an integrating sphere 14 containing a photoelectric cell (not shown) sensitive to the light range being transmitted through the samples. When reflection measurements are to be made the cells 12, 13 are removed and the sample is positioned in holder 15 with a reference reflecting surface which may be a block of magnesium carbonate at 16.

Instruments of this particular type are so constructed that the light beams transmitted through, or reflected by, the unknown sample and the reference standard are maintained at equal intensity. This is accomplished by turning the photometering prism in housing 10 with electric motor 20 through suitable speed reduction 21 and linkage 22 until the beam passing through or reflected by the reference standard is of such diminished relative intensity that it is equal in intensity to the beam transmitted by or reflected from the sample. The angle to which the photometering prism is turned to accomplish this purpose is recorded by a pen 25 operating through suitable cams in housing 23 and cable 24 in terms of relative light transmission or reflectance of the sample at the wave length of the incident light. As shown in the figure the recording pen moves parallel to the axis of the recording drum 26.

When examining objects spectrophotometrically the wave length of the light being sent through the instrument is caused to vary over a desired range so that the transmission or reflection characteristics of the sample at these wave lengths may be determined. A device such as the monochromator previously described is often employed for this purpose. It will be understood however that other types of monochromators are known and may be used with slight modifications with the instrument herein described. Since one of the coordinates of the recorded data represents relative intensity of the light transmitted by or reflected from the sample it will be apparent that the other coordinate to be recorded must represent wave length, frequency, or some function thereof, of the substantially monochromatic light being transmitted or reflected by the sample. Accordingly means are provided to coordinate the rotation of the recording drum with reference to the wave length of the light being transmitted through the instrument.

Rotation of the recording drum with change of wave length is brought about through the wave-length-shifting and magnification-selecting mechanism which comprises an essential feature of my invention. In this mechanism a motor 30 (Fig. 1) turns, through a suitable gear reduction 31 and friction clutch 32, a shaft 33 mounted in appropriate bearings 34, 34'. Securely keyed to the shaft is a cam 35 of selected profile engaging the monochromator drive rod 8. A projection on the cam, or attached to the shaft, may be provided to prevent complete rotation of the cam with resultant damage to the cam follower. As the shaft and cam are turned by the motor the drive rod 8 causes the monochromating slit to move through the spectrum formed by the optical system previously described thereby allowing substantially monochromatic light of constantly changing wavelength to pass through the instrument. Springs 36, 36' hold the monochromator carriage against drive rod 8 at all angular positions of the cam. A holder 37 for the drive rod may consist simply of a piece of angle iron with pairs of flanged pulleys 38 and 39 mounted so as to hold the drive rod in place. Slots 40 and 41 permit lateral adjustment of the monochromator drive rod so that it may be moved to one side to engage a different cam 45 of some other desired profile. Means for adjusting the length of the drive rod 8 may be provided for as shown at 46. Rotation of the recording drum with respect to the movement of the monchromator slit and rotation of shaft 33 is provided through the mechanism shown in detail in Figs. 2, 3 and 4 in which the same parts bear the same identifying numerals.

Referring now to Fig. 4 a disk 50 will be seen rigidly secured to shaft 33 by a key 51. This disk has two sets of tapered indexing holes lying on concentric circles. The holes 52 of the inner circle are located around the circle with an angular spacing of approximately 18° although it will be obvious that any other convenient angular placement may be employed. The indexing holes 53 of the outer circle are also placed at intervals of 18° around the circle. On the outer periphery of the disk are located a number of radially projecting studs 54 also spaced 18° apart as shown on Fig. 2. These studs serve as stops in conjunction with a mechanism to be described below.

As will be apparent from the description of the apparatus given thus far the angular position of the shaft will determine the location of the monochromator control slit and the wave length of the light issuing therefrom. Accordingly a scale, or scales, may be engraved upon the face of the head disk 50 and a window and pointers provided in the head disk cover 59 so that the operator can determine at a glance the wavelength, or frequency, of the monochromatic light issuing from the monochromator. Such a scale is indicated at 55 in Fig. 2.

Another disk-like member 56 is mounted in bearings on shaft 33 so that it is free to turn independently thereof. A tapered hole 57 is provided in alignment with the holes 53 of the outer circle of head disk 50 as shown in Fig. 4. Disk 56 is also provided with grooves around its outer edge to receive cables 59. A third member 60 is also journaled on the shaft 33 in such manner that it may turn independently thereof. This member also has a single tapered hole 61, located in alignment with the inner circle of holes in head disk 50. A knurled control knob 62 may be provided for convenience in turning this member by hand. The disk 60 also is provided with grooves to receive cables 64.

The shaft 70 (Fig. 3) of the recording drum 26 is provided with grooved pulleys 71 and 72 both being keyed thereto. The cables 59 and 64 are of a material of low extensibility such as phosphor bronze and are provided with turn buckles 73, 74, 75 and 76 to eliminate any slack which may develop. The cables are preferably wrapped around the periphery of the disks 56 and 60 and the grooved pulleys 71 and 72 and then anchored with set screws so that there can be no slippage between the disks and the recording drum.

In order to prevent the anchored cables from being injured or torn out by turning the recording drum too far in one direction an automatic stopping device is provided. A pair of pawls 80 and 81 (Fig. 2) are mounted in brackets 82 and 83 with springs 84 and 85 normally holding them away from head disk 50 as illustrated by pawl 81 in Fig. 2. When in this position the radially projecting studs 54 may pass by the end of the pawls without interference. A cam-like projection 86 is fastened to the recording drum pulley 72. When the recording drum is turned in the position shown in Fig. 2 the cam-like projection strikes the end of pawl 80 and forces it toward the head disk as shown in the drawings. A projecting stud on the head disk 50 contacts the pawl and further movement of the head disk is prevented. When the recording drum is turned in a clockwise direction the cam-like projection 86 contacts the lower pawl 81 forcing it into the path of a projecting stud thus stopping further movement of the head disk in that direction.

The operation of my improved spectrophotometer will now be described in conjunction with Fig. 5 in which curve A represents the recorded spectrophotometric transmission characteristics of a didymium filter over a wavelength range of from 375 m$\mu$ to 750 m$\mu$. To obtain curve A the instrument is fitted with a cam 35 having a profile such that a half turn (180°) of the cam causes the monochromator control slit to move through a spectral band in which the numerical value of the maximum wave length is twice that of the minimum wave length, for example 375 m$\mu$ to 750 m$\mu$. More broadly speaking, each equi-angular change in the position of the cam produces the same fractional change in the wavelength of the radiation being emitted from the monochromator control. Angular position of the shaft 33 is thus a logarithmic function of the wavelength which the control slit passes. The didymium glass filter is placed in the position occupied by cell 13 shown in Fig. 1, the monochromator light is turned on and coordinate paper is wrapped around the drum 26. The operator of the instrument then turns shaft 33 by means of operating handle 90 until the engraved scale indicates that the monochromator is emitting substantially monochromatic light having a wavelength of 375 m$\mu$. The front disk 60 is then turned in a clockwise direction by knurled knob 62 until the cam on the recording drum pulley actuates pawl member 81 and prevents further movement. When the coordinate paper is positioned on the recording drum properly the pen of the recording device is directly over the abscissa marked 375 m$\mu$, the wavelength of the light passing through the instrument. Indexing pin 91 may then be inserted in tapered hole 61 of the front disk and into tapered hole 52 of the head disk. Front disk 60 is thus secured to head disk 50 and will rotate therewith without backlash. The back disk 56 not being directly coupled to the head disk may turn freely in a direction determined by the cables 59. The instrument in this position is now ready to record spectrophotometric data.

When the instrument is ready for operation photometering control motor 20 will turn the photometering prism and the recording pen will move to a point on the graph paper along a line parallel to the axis of the recording drum indicating that 45% of the incident light of 375 mμ is passing through the didymium filter. Monochromator control motor 30 is started and the shaft 33 with cam 35 is turned causing the monochromator slit to traverse the spectrum and pass light of increasing wavelength. As the wavelength of light passing through the didymium filter increases the relative intensity of the light passing through the filter also varies and the recording pen traces the curve A shown in Fig. 5. As will be apparent, the profile of the cam, the respective diameters of the disk 60 and recording drum pulley 72 must be so interrelated with the abscissa markings on the coordinate graph that the recording pen plots wavelength values which actually correspond with the monochromatic light being passed through the instrument. The relative sizes of these parts of the instrument depend upon the particular type of monochromator control employed, the physical dimensions of the coordinate paper and other factors which can be correlated by the manufacturer of the instrument. Ordinarily I proportion these parts so that a 180° turn of the shaft 33 will cause the recording drum to turn to an extent such that the pen covers a grid width of 19 cm. on the coordinate paper wrapped on the recording drum.

Examination of curve A will disclose a number of sharply distinguishable absorption and transmission regions. Such depressions and peaks are observed in the photometric curves of most colored bodies and make it possible to identify them by spectrophotometric data. It is therefore desirable in many cases to study these characteristic parts of the curve with greater particularity. For example it may be desirable to study the portion of the curve A lying between the points b—b'. With my improved spectrophotometer this is a very simple matter and highly accurate curves of this part of the spectra may be obtained quickly without making any major change in the spectrophotometer. To obtain a magnified section of the A curve between the points b—b', the operator simply raises the recording pen, and turns the control handle 90 in a clockwise direction until the lower pawl 81 stops further movement of the recording drum and head disk. The control handle is then backed away a few degrees to release pawl 81 so that the head disk with its projecting studs may turn. The indexing pin 91 is then removed and the control handle 90 turned until the wavelength range corresponding to point b on the curve appears at the pointer in the window. Friction clutch 32 on shaft 33 enables the shaft to be turned in this manner without damage to the gear reduction system 31. The pin 91 is now inserted through one of the indexing holes 53 in the head disk into the tapered hole 57 in the rear disk 56. The recording pen is positioned on the coordinate paper and the instrument placed in action. As the monochromator drive rod motor turns the shaft 33 the cam 35 will move the monochromator control slit through the spectrum as described before. The rear disk being of a diameter greater than the pulley 71, the recording drum will be caused to make an almost complete turn and the pen trace a path of 19 cm. while the head disk is turning approximately 36°. Accordingly while the monochromator slit is moving through the range between b and b' the recording pen will move over the surface of the coordinate paper on the path shown in curve B in the figure. As shown, curve B has a magnification five times that of curve A.

Should the operator also wish to obtain a magnified curve of any other portion of curve A he may easily do so. The procedure to obtain a five-fold magnification of curve A between the range c—c' is as follows: Control handle 90 is turned in a clockwise direction as far as pawl 81 permits. The control handle is then backed away a few degrees to release pawl 81 so that the head disk with its projecting studs may turn. Indexing pin 91 is then removed and control handle 90 turned until the wavelength scale shows that the monochromator is emitting light corresponding to that of the wavelength of point c. Indexing pin 91 is then inserted through one of the holes 53 into the hole 57 of the back disk 56 and the instrument is then placed in action. Curve C is the result. Five-fold magnification curves of any other portion of curve A may be obtained in the same simple and rapid way. Other magnifications may be obtained by employing a different turning ratio between the shaft 33 and recording drum 26.

Spectrophotometric data which may include wavelengths outside the visible range, for example 530 mμ to 1060 mμ, may be obtained as simply and quickly as in the case of the other curves described. If necessary, a photoelectric cell sensitive to the infrared range may be substituted in the integrating sphere 14. The operator then turns control handle 90 in a clockwise direction as far as pawl 81 permits and then backs it away a few degrees as previously described. Indexing pin 91 is then removed and the head disk turned until the wavelength scale shows that the monochromator control is emitting light of 530 mμ wavelength. Indexing pin 91 is then placed in hole 61 of the front disk 60 engaging one of the holes on the inner circle of the head disk. The recording pen is then positioned on the coordinate paper and the instrument placed in action. The curve plotted covers the range 530–1060 mμ. Any other desired range within the scope of the spectrophotometer may be selected and plotted in the same manner.

When the front disk is coupled to the head disk of the particular instrument shown the maximum wavelength plotted is twice that of the minimum wavelength value; that is the curve may be from 375 mμ to 750 mμ, 530–1060 mμ, 300–600 mμ, etc. By the use of a larger recording drum, larger coordinate paper, and larger recording drum pulley, the instrument can be made to plot a continuous curve over its entire range or, for example, from 300 mμ to 1100 mμ. By increasing the size of the recording drum pulley 72 the full scope of the instrument may be utilized on coordinate paper of standard width but at a diminished magnification. I prefer, however, to construct my spectrophotometer so that the visible range, i. e. 375 mμ to 750 mμ, normally occupies the full useful width of the coordinate paper.

Other modifications may also be made in the instrument to increase its usefulness without departing from the scope of my invention. For example, means may be provided for magnifying the recorded curves in the ordinate representing relative transmission or reflection. This may be done by employing interchangeable cams of various configurations at 23 (Fig. 1) in the system linking the photometering prism with the recording pen. Means for varying the width of the monochromator control slit as the slit traverses the spectrum may also be provided but when employing the logarithmic cam 35 as described herein the advantages of a variable slit are greatly diminished.

What I claim is:

1. In a recording spectrophotometer having a light source, a monochromator with a movable monochromator control, a movable photometering element and a recording device actuated upon movement of the monochromator control and upon movement of the photometering element said recording device comprising a movable record receiving element and a movable recording element, the improvement which comprises a drive linkage between the monochromator control and the recording device comprising a rotatable shaft linked to the monochromator control to actuate the monochromator control in response to rotation of the shaft and a variable ratio driving means on said shaft linked to the recording device permitting selective control of the relative rate of movement of an element of the recording device with respect to the movement of the monochromator control.

2. In a recording spectrophotometer having a light source, a monochromator with a movable monochromator control, a movable photometering element and a recording device actuated upon movement of the monochromator control and movement of the photometering element said recording device comprising a movable record receiving element and a movable recording element, the improvement which comprises a drive linkage between the monochromator control and the recording device comprising a rotatable shaft linked to the monochromator control to actuate the monochromator control in response to the rotation of the shaft, a disc-like member having indexing means, said disc being rigidly mounted on the rotatable shaft, a second disc-like member rotatably mounted on said shaft and provided with indexing means cooperative with the indexing means of the first disc-like member to fix the relative angular position of the second disc-like member with respect to the first disc-like member and means connecting the second disc-like member for movement of a unit of the recording device so that an angular movement of the shaft causes a proportionate movement of the unit of the recording device.

3. A recording spectrophotometer according to claim 2 in which the mechanism linking the rotatable shaft to the monochromator control includes a cam rigidly mounted on the shaft, said cam having a profile of such configuration that each equi-angular movement of the shaft causes the same fractional change in the wavelength of the radiation emitted by the monochromator control.

4. In a recording spectrophotometer having a light source, a monochromator with a movable monochromator control, a moveable photometering element and a recording device comprising a movable recording element actuated by movement of the photometering element and a rotatable record receiving element actuated by movement of the monochromator control, the improvement which comprises a drive linkage between the monochromator control and the record receiving element comprising a rotatable shaft linked to the monochromator control to actuate the monochromator control in response to rotation of the shaft, a disc-like member having indexing means said disc being rigidly mounted on the rotatable shaft and bearing a series of stops at spaced intervals on its periphery, a pair of slidably mounted pawls adapted to engage said stops, said pawls being normally held out of engagement with the stops, a projecting member attached to the record receiving element adapted to force the pawls into engagement with one of the said stops upon rotation of the record receiving element thereby preventing further rotational movement of both record receiving element and disc, a second disc-like member rotatably mounted on said shaft and provided with indexing means cooperative with the indexing means of the first disc-like member to fix the relative angular position of the second disc-like member with respect to the first disc-like member and means connecting the second disc-like member to the record receiving element so that an angular movement of the shaft causes a proportionate movement of the record receiving element.

5. In a recording spectrophotometer of the flickering beam type having a light source, a slidably mounted monochromator control comprising members forming a slit, a rotatable Rochon prism, a recording device comprising a slidably mounted recording pen actuated by rotation of the Rochon prism and a rotatable recording drum actuated by movement of the slidable monochromator control, the improvement which comprises a drive linkage between the monochromator control and the recording drum comprising a rotatable shaft linked to the monochromator control through a logarithmic cam mounted on the shaft to actuate the monochromator control in response to rotation of the shaft, a disc-like member having a plurality of indexing holes, said disc being rigidly mounted on the shaft, a second disc-like member rotatably mounted on the shaft and provided with an indexing hole positioned in alignment with the indexing holes of said disc whereby the relative angular position of the second disc-like member may be fixed with respect to the first disc-like member by insertion of a pin through the indexing holes of the two discs, means connecting the second disc-like member with the recording drum so that an angular movement of the disc causes a proportionate movement of the recording drum, a third disc-like member rotatably mounted on the shaft and provided with an indexing hole cooperative with the indexing holes of the rigidly mounted disc-like member so that the relative angular position of the third disc-like member may be fixed with respect to said rigidly mounted member by means of a pin and means connecting the third disc-like member with the recording drum so that an angular movement of the disc causes a proportionate movement of the recording drum, the angular movement of the drum due to an angular movement of the third disc-like member being different from the angular movement of the drum caused by an equi-angular movement of the second disc-like member.

6. In a recording spectrophotometer having a light source, a monochromator with a movable monochromator control, a movable photometering element and a recording device actuated upon movement of the monochromator control and upon movement of the photometering element said recording device comprising a movable record receiving element and a movable recording element, the improvement which comprises a drive linkage between the monochromator control and the recording device comprising a rotatable shaft linked to the monochromator control to actuate the monochromator control in response to rotation of the shaft, a variable ratio driving means on said shaft linked to the recording device permitting selective control of the relative rate of movement of an element of the recording device with respect to the movement of the monochromator control said variable ratio driving means having in association therewith a selective coupling element permitting selective control of the position of the monochromator control with respect to the initial position of the same recording element.

WILLIAM A. SHURCLIFF.